US010332070B2

(12) United States Patent
Mulaosmanovic et al.

(10) Patent No.: US 10,332,070 B2
(45) Date of Patent: *Jun. 25, 2019

(54) AUTOMATIC REGISTRATION OF ASSET TAGS BASED ON CROWD SOURCING ASSET CONTEXT

(71) Applicant: BlackBerry Limited, Waterloo (CA)

(72) Inventors: Jasmin Mulaosmanovic, Kitchener (CA); Robert Joseph Lombardi, Hamilton (CA); Mohammed Nawaf Smadi, Ancaster (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/958,112

(22) Filed: Apr. 20, 2018

(65) Prior Publication Data

US 2018/0240064 A1      Aug. 23, 2018

Related U.S. Application Data

(63) Continuation of application No. 15/229,161, filed on Aug. 5, 2016, now Pat. No. 9,953,289.

(51) Int. Cl.
*G06K 7/10* (2006.01)
*G06Q 10/08* (2012.01)

(52) U.S. Cl.
CPC ....... *G06Q 10/087* (2013.01); *G06K 7/10376* (2013.01); *G06Q 10/08* (2013.01)

(58) Field of Classification Search
CPC ....... G06K 2017/0051; G06K 7/10019; G06K 7/10108; G06Q 10/08
See application file for complete search history.

(56) References Cited

U.S. PATENT DOCUMENTS

| 6,738,628 | B1 | 5/2004 | McCall et al. |
| 7,315,281 | B2 | 1/2008 | Dejanovic et al. |
| 8,344,879 | B2 | 1/2013 | Hamon |
| 9,953,289 | B2* | 4/2018 | Mulaosmanovic ......... G06K 7/10376 |
| 2005/0253725 | A1 | 11/2005 | Neuwirth et al. |

(Continued)

OTHER PUBLICATIONS

Xu et al.: "Accuracy of Location Identification with Antenna Polarization on RSSI", Proceedings of the International MultiConference of Engineers and Computer Scientists 2009 vol. I, IMECS 2009, Mar. 18-20, 2009, Hong Kong.

(Continued)

*Primary Examiner* — Seung H Lee
(74) *Attorney, Agent, or Firm* — Rowand LLP

(57) ABSTRACT

A server-implemented method for automatically registering an asset tag in a database is disclosed. One or more asset tag collision reports are received from at least one mobile device connected to the server, each report including a tag identifier of the asset tag that is wirelessly broadcast by the asset tag. A location of the asset tag is determined based on the one or more received asset tag collision reports. A first asset is selected from a set of unregistered assets that are identified as being deployed in the indoor facility based on determining that there is a match between the location of the asset tag and location information associated with the first asset. The asset tag is then registered in association with the first asset in the database.

21 Claims, 4 Drawing Sheets

(56) References Cited

U.S. PATENT DOCUMENTS

2006/0055530 A1    3/2006  Wang et al.
2006/0176177 A1    8/2006  Heinze et al.
2009/0309732 A1   12/2009  Truscott et al.
2012/0179585 A1    7/2012  Guzzo

OTHER PUBLICATIONS

Kyamakya et al.: "An Indoor Bluetooth-Based Positioning System: Concept, Implementation and Experimental Evaluation", Institute of Communications Engineering, Jan. 2013
Fernandes: "Indoor Localization Using Bluetooth", Proceedings of the 6th Doctoral Symposium in Infromalitics Engineering, Jan. 27-28, 2011
U.S. Appl. No. 14/835,836, filed Aug. 26, 2015
International Search Report and Written Opinion, related to application PCT/CA2017/050889, dated Oct. 5, 2017.
EPO, Extended European Search Report relating to EP application No. 17183205.8, dated Sep. 29, 2017.
CIPO Office Action dated Jul. 28, 2017.
EPO, EP Examination Report relating to EP application No. 17183205.8, dated Apr. 10, 2019.

* cited by examiner

AUTOMATIC REGISTRATION OF ASSET TAGS BASED ON CROWD SOURCING ASSET CONTEXT

CROSS-REFERENCE TO RELATED APPLICATIONS

The present application is a continuation of U.S. patent application Ser. No. 15/229,161, granted as U.S. Pat. No. 9,955,316 on Apr. 24, 2018, the contents of which are hereby incorporated by reference.

TECHNICAL FIELD

The present disclosure relates to asset tracking, and more particularly, to systems and methods for tracking locations of assets in an enterprise environment.

BACKGROUND

Various assets of an enterprise, such as inventory and equipment, may be distributed and moved throughout the enterprise's facilities. For example, in a company office building or campus, physical assets may be deployed to multiple different locations, relocated within the facility, or removed from the premises. Asset tracking and management systems can monitor the movement of physical assets throughout a facility. Manual tracking of assets in a facility is generally a laborious process and can be a significant drain on workplace productivity. On the other hand, installing complex and expensive hardware for tracking assets may not be feasible or practically desirable.

BRIEF DESCRIPTION OF DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

Figure 1:
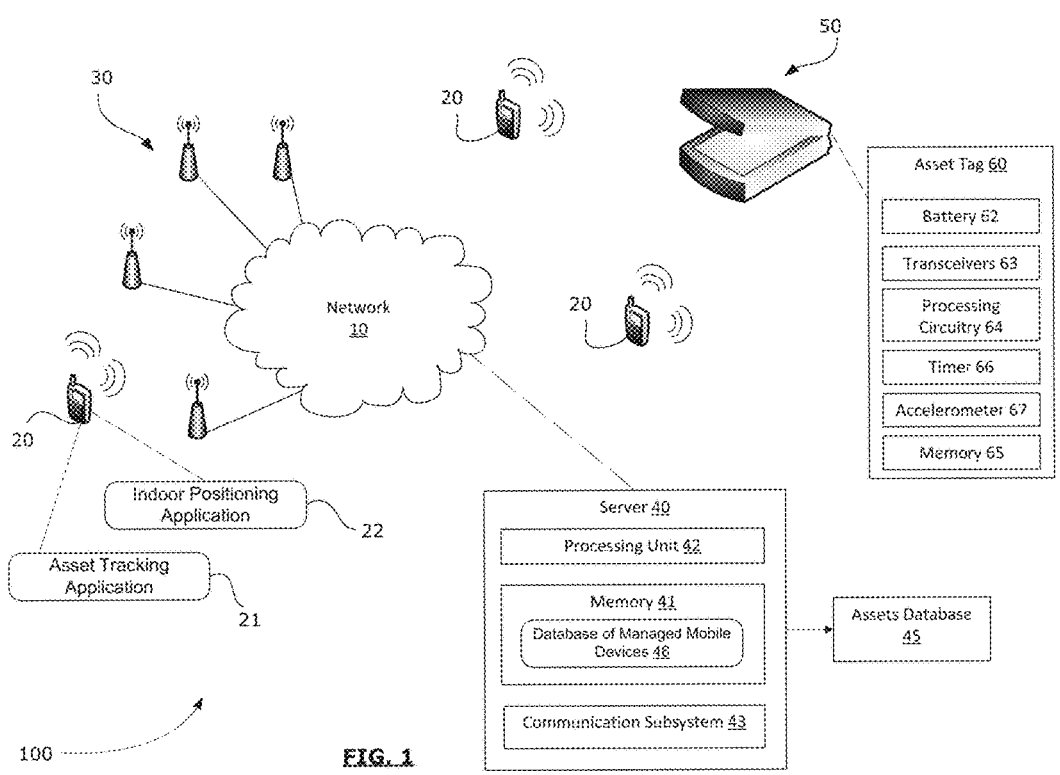
FIG. 1 diagrammatically shows an asset tracking system for an indoor facility in accordance with example embodiments of the present disclosure.

In an aspect, the present disclosure describes a method for registering an asset tag in a database, where the asset tag is used to track a location of an asset in an indoor facility. The method includes: receiving, from at least one mobile device connected to the server via a wireless communication network, one or more asset tag collision reports, each of the one or more asset tag collision reports including a tag identifier of the asset tag, wherein the tag identifier is transmitted to the at least one mobile device in wireless signals broadcast by the asset tag; determining a location of the asset tag based on the one or more received asset tag collision reports; selecting a first asset from a set of one or more unregistered assets that are identified as being deployed in the indoor facility based on determining that there is a match between the location of the asset tag and location information associated with the first asset; and registering the asset tag in association with the first asset in the database.

In another aspect, the present disclosure describes a system for registering and managing asset tags. The system includes: an asset tag for use in tracking a location of an asset in an indoor facility; at least one mobile device configured to detect wireless signals broadcast by the asset tag; and a server connected to the at least one mobile device via a wireless communication network. The server is configured to: receive, from the at least one mobile device, one or more asset tag collision reports, each of the one or more asset tag collision reports including a tag identifier of the asset tag, wherein the tag identifier is transmitted to the at least one mobile device in wireless signals broadcast by the asset tag; determine a location of the asset tag based on the one or more received asset tag collision reports; select a first asset from a set of one or more assets that are identified as being deployed in the indoor facility based on determining that there is a match between the location of the asset tag and location information associated with the first asset; and register the asset tag in association with the first asset in the database.

In yet another aspect, the present disclosure describes a non-transitory computer-readable medium storing processor-executable instructions for a server to register an asset tag in a database. The instructions include: instructions to receive, from at least one mobile device connected to the server via a wireless communication network, one or more asset tag collision reports, each of the one or more asset tag collision reports including a tag identifier of the asset tag, wherein the tag identifier is transmitted to the at least one mobile device in wireless signals broadcast by the asset tag; instructions to determine a location of the asset tag based on the one or more received asset tag collision reports; instructions to select a first asset from a set of one or more unregistered assets that are identified as being deployed in the indoor facility based on determining that there is a match between the location of the asset tag and location information associated with the first asset; and instructions to register the asset tag in association with the first asset in the database.

Other example embodiments of the present disclosure will be apparent to those of ordinary skill in the art from a review of the following detailed descriptions in conjunction with the drawings.

The present application makes reference to "defined area" of an indoor facility. This term is intended to cover any space in an indoor facility which has finite dimensions (e.g. area) and defined boundaries, such as a room, a passage, a workspace, etc. For example, geo-fences may be defined within a facility to demarcate the boundaries of defined areas. An indoor positioning system or asset tracking and management system may have access to various floor plans of a facility, which may facilitate identification of defined areas and structural relationships between the defined areas.

The present application makes reference to the status of an asset or an asset tag as being "registered". An asset tag is registered if a pairing of the asset tag with an associated asset is stored in a database that is accessible by an asset tracking system. An unregistered asset tag is one that has not been registered. For example, if a deployed asset is retrofitted with an asset tag or if an asset is newly deployed with an asset tag, the asset tag may not have been registered. By registering an asset tag in association with an asset, the access tracking system can monitor the movement of the asset by virtue of the mapping between the location of the asset tag (which may be determined based on broadcast signals from the asset tag) and the location of the asset. Similarly, an asset is registered if a pairing of the asset with an associated asset tag is stored in a database that is accessible by an asset tracking system.

Various asset tracking systems employ radio frequency identification (RFID) technologies for locating objects in GPS-denied environments, such as office buildings. In such systems, wireless RFID tags may be connected to assets to assist in tracking the locations of the assets within an indoor facility. These dedicated tracking systems typically involve a plurality of RFID gateway readers and passive or active RFID tags connected to assets. The readers continuously monitor the locations of the assets by sending out trigger or polling signals to which the tags respond. Other asset tracking solutions, such as those based on near field communication (NFC) or Bluetooth low energy (BLE) technologies, may also rely on the use of asset tags.

In order to track an asset using an asset tag, the asset tag is generally required to be registered in association with the asset, for example, in a database maintained as part of an asset management system. In particular, each pairing of an asset with its associated asset tag is stored in a database that is accessible by the asset management system. Where a large number of asset tags are to be deployed in a facility, manual registration of each tracked asset with its associated asset tag can be onerous and time-consuming. For example, the physical assets in a facility may be retrofitted with asset tags simply by connecting tags to the assets. In particular, assets that have already been deployed in a facility may subsequently be adapted for tracking and management, by retrofitting with asset tags. However, such retrofitting may be undesirable if each pairing of an asset with its associated asset tag is required to be manually registered at the time of connecting the tags.

In one aspect, the present application proposes an asset tracking and management system that uses crowd-sourcing to register asset tags in association with their respective assets. Rather than relying on manual registration of asset tags prior to tracking of assets in a facility, the present system and methods use data collected from a plurality of devices in the facility to identify pairings of unregistered asset tags with their associated assets. More specifically, the present system and methods collect location data associated with user devices, in their ordinary use within the facility, that are in close proximity to one or more asset tags being tracked, in order to approximate the locations of the asset tags. The asset tags can then be paired with their respective assets, based on matching the estimated locations of the asset tags with location information associated with the assets. In this way, pairings of assets with their asset tags may be automatically built up and registered with an asset tracking system as a result of the normal disposition of user devices rather than express manual registration.

System Overview

Reference is first made to FIG. 1, which diagrammatically shows an example embodiment of an asset tracking system 100 for an indoor facility 110 (not shown). The asset tracking system 100 is connected to a network 10. The network 10 may include one or more wired or wireless communication networks, or combinations of both. For example, the network 10 may be a Wireless Local Area Network (WLAN) that conforms to the IEEE 802.11 standards (sometimes referred to as Wi-Fi). The network 10 includes one or more wireless access points (APs) 30, such as Wi-Fi APs, which can transmit and receive radio frequencies for communication with wireless-enabled devices. The wireless APs 30 provide wireless connectivity to mobile devices 20 and any computing devices within a local coverage area (such as an indoor facility) that are equipped for wireless communication using a designated protocol, such as IEEE 802.11. In at least some embodiments, the wireless APs 30 are distributed throughout the indoor facility 110 in known locations and each wireless AP 30 may be configured to periodically broadcast an identifier unique to the AP 30.

The asset tracking system 100 includes one or more mobile devices 20. In various example embodiments, the mobile device 20 may be a multi-mode communication device configured for both data and voice communication, a mobile telephone (e.g. smartphone, cellular phone), a tablet computer (e.g. slate computer), a wearable electronic device (e.g. watch, smart glasses), a personal digital assistant (PDA), or a mobile computer system such as a laptop or netbook. In the asset tracking system 100 of FIG. 1, the mobile devices 20 are equipped for wireless communication via the wireless APs 30 and are capable of receiving broadcast messages or signals output by the wireless APs 30. According to known techniques, a mobile device 20 can measure the relative received signal strength (RSSI) of detected signals from the wireless APs 30, as well as other sources of radio frequency transmission. The mobile devices 20 may send and receive communication signals over the network 10 after the required network registration or activation procedures have been completed. It will be appreciated that the asset tracking system 100 may also include one or more stationary electronic devices (not shown), such as desktop computers or voice-over-IP (VoIP) phones.

In at least some embodiments, the mobile devices 20 may be managed by a Mobile Device Management (MDM) system. An MDM system includes a central server component, which administers and monitors the mobile devices 20, and a client component, which can be run on a mobile device 20 to receive and execute management commands from the server component. The MDM system enables an administration server to, among other functionalities, configure and update device settings over-the-air, enforce security policies and compliance rules, and remotely deploy applications to end-users. Modern MDM systems are typically implemented via device management software that can run on subscriber devices.

In some embodiments, a mobile device 20 may include an asset tracking application 21. The mobile device 20 may detect wireless signals broadcast by one or more asset tags 60 associated with assets 50 in the indoor facility 110. In particular, the asset tracking application 21 may be configured to indicate RSSI measurements for wireless signals transmitted by the one or more asset tags 60 deployed throughout the indoor facility.

In at least some embodiments, the mobile device 20 may include an indoor positioning application 22. For example, in a network such as the WLAN of FIG. 1, an indoor positioning application 22 may be configured to detect RSSI measurements for wireless signals from a plurality of APs. The indoor positioning application 22 can send the measured RSSI values to a remote server implementing an indoor positioning system. The server may then perform the computational work of correlating the RSSI values measured by the mobile device 20 with wireless AP fingerprints that are themselves correlated to a location in the indoor facility 110. In this manner, the indoor positioning application 22 may determine, for example, the current location of the mobile device 20. In some other embodiments, the indoor positioning application 22 may itself attempt to correlate measured RSSI values with wireless AP fingerprint data for the indoor facility 110, without transmitting the RSSI measurements to a remote server. The wireless AP measurements may be obtained, for example, from a chipset, such as a Wi-Fi chip.

Other techniques for indoor navigation may be implemented by the indoor positioning application 22. For example, sensor data may be collected from a plurality of built-in sensors on the mobile device 20, such as accelerometers, gyroscopes and/or magnetometers, and processed by the indoor positioning application 22 for implementing a sensor fusion algorithm. As a further example, the indoor positioning application 22 may be configured to measure a round-trip time (RTT) to a plurality of wireless APs, based on signals exchanged with the APs, in order to estimate a current position of the mobile device 20. In at least some embodiments, the indoor positioning application 22 may use one or more hybrid algorithms for determining positions within the indoor facility 110. In particular, a combination of techniques that exploit properties of wireless signals received from wireless APs may be implemented by the indoor positioning application 22. For example, a hybrid RSSI-RTT localization technique may be employed for tracking the location of the mobile device 20.

The asset tracking application 21 and the indoor positioning application 22 may be standalone applications or integrated with one another. For example, the indoor positioning application 22 may be integrated into the asset tracking application 21, allowing a graphical map interface module of the asset tracking application 21 to display the relative position of the mobile device 20 with respect to one or more tracked assets 50 within the indoor facility 110.

The mobile device 20 may include a short-range wireless communication interface that provides for communication between the mobile device 20 and different systems or devices, which need not necessarily be similar devices. For example, the short-range communication interface may include an infrared device and associated circuits and components, or a Bluetooth® module to provide for communication with similarly-enabled systems and devices.

The asset tracking system 100 includes one or more asset tags 60 associated with assets 50 that are deployed in the indoor facility 110. In an enterprise setting, various physical assets may be shared between multiple employees or transferred from one employee to another. In particular, assets may be moved when needed by different individuals or projects. For example, as illustrated in FIG. 1, the asset 50 may be office equipment. Such assets may be misplaced or not returned to their originating locations after use, or deliberately relocated to new locations within the indoor facility 110 (for example, after personnel change). Asset tags can facilitate tracking the locations of assets by broadcasting wireless signals which may be detected by various components of an asset tracking system.

The asset tag 60 includes a housing which provides a durable structure to hold the components of the asset tag 60. The housing of the asset tag 60 may be integral with the asset 50 or may be secured to the asset 50 by affixing to an exterior surface of the asset 50. For example, the asset tag 60 can be attached to an asset 50 using an adhesive strip on at least one surface of the housing of the asset tag 60. The asset tag 60 may alternatively be built in to the asset 50 itself or enclosed in a packaging of the asset 50.

The asset tag 60 also includes a battery 62. The battery 62 powers the components of the asset tag 60. In at least some embodiments, the battery 62 is replaceable. The housing of the asset tag 60 may include a built-in indicator providing visual or auditory indication of the charge state of the battery 62. For example, a light-emitting diode (LED) indicator may be turned on or set to blink when the detected level of battery charge falls below a threshold value.

When an asset tag 60 that is connected to an asset 50 is activated, the asset tag 60 may broadcast signals to indicate that it has been turned on. The asset tag 60 may include at least one wireless transceiver 63 for transmitting wireless signals. A signal broadcast by the asset tag 60 may be received by one or more electronic devices within a vicinity of the asset 50. In at least some embodiments, the wireless transceiver 63 may transmit signals using short-wavelength ultra-high frequency (UHF) radio waves. For example, the radio waves may be in the Industrial, Scientific and Medical (ISM) 2.4 GHz short-range radio frequency band. In some embodiments, the wireless transceiver 63 may be based on the Bluetooth® Low Energy (BTLE) specification, which can provide considerably reduced power consumption and cost compared to classic Bluetooth® while maintaining a similar communication range. It will be appreciated that the asset tag 60 may also or alternatively implement other types of short-range radio frequency communication protocols, such as NFC. The asset tag 60 is capable of sending data to and receiving data from those electronic devices in the indoor facility 110 that are equipped for wireless communication.

The asset tag 60 may also include one or more sensors. In at least some embodiments, the asset tag 60 includes an accelerometer 67. The accelerometer 67 is a device that generates an output signal in dependence on the acceleration of the accelerometer 67 and specifies the magnitude and/or direction of acceleration. The accelerometer 67 may be integrated into the housing of the asset tag 60 and generate accelerometer outputs based on movements of the asset tag 60.

The asset tag 60 may also include processing circuitry 64, memory 65 and a timer 66. The processing circuitry 64 may include any combination of digital or analog circuitry for receiving signals from the accelerometer 67 and controlling operations of the transceiver 63 in accordance with a desired protocol of operation. Example operations are described below. In some embodiments, the processing circuitry 64 may include discrete logic components, a field programmable gate array (FPGA), an application specific integrated circuit (ASIC), or other digital or analog circuitry.

The timer 66 may be a separate circuit element that is coupled to the processing circuitry 64 and is capable of providing a timestamp for an event associated with the asset tag 60. In some cases, the timer 66 is implemented by the processing circuitry 64 instead of being a separate element. In at least some embodiments, the processing circuitry 64 may be coupled to one or more of the wireless transceiver 63, the accelerometer 67, the timer 66, the battery 62 and memory 65.

The asset tracking system 100 includes a server 40 that is connected to the network 10. The server 40 may be configured to determine the locations of one or more of the mobile devices 20 and perform the computational work in estimating the locations of asset tags 60 within the indoor facility 110. In at least some embodiments, the server 40 may be implemented as a collection of a plurality of server computers. The server 40 may include a memory 41, a processing unit 42 and a communication subsystem 43. In some embodiments, the memory 41 may store device information for one or more of the mobile devices 20 and their associated locations within the indoor facility 110. For example, the memory 41 may contain a database 46 of managed mobile devices 20 in the indoor facility 110. For a managed mobile device 20, the database 46 may indicate one or more of: a device identifier (e.g. serial number, phone number); a user associated with the device 20; history of visited locations in the indoor facility 110 (including associated timestamps); and a current location of the device 20. The memory 41 may optionally store map data identifying the current locations of the managed mobile devices 20. In some cases, the server 40 may not have device information for the mobile devices 20 in the indoor facility 110. In other words, when a mobile device 20 in the indoor facility 110 detects a wireless signal from an asset tag 60, the mobile device 20 may be configured to establish a connection to the server 40 for the first time and transmit device information for the mobile device 20 to the server 40 for processing by the server 40.

The server 40 of the asset tracking system 100 has access to an assets database 45. The assets database 45 may be stored in the memory 41, or remotely accessed by the server 40 for retrieving and updating data associated with the assets 50. In at least some embodiments, the assets database 45 contains a record of the assets 50 that are known to be or identified (for example, by one or more entities) as being deployed in the indoor facility 110 and stores various useful information pertaining to the assets 50. For example, the assets database 45 may contain data relating to a plurality of deployed assets 50, including, but not limited to: asset identifiers (e.g. type of asset); age of the asset; identifiers for an associated asset tag; registration status of the asset tag and/or asset; history of visited locations and associated timestamps; current location of the asset; identifiers of mobile devices that reported detected signals from the associated asset tag; first date/time of tracking; last date/time of location update; asset-user associations; maintenance information for the asset; and last date/time of change of battery of the associated asset tag.

The processing unit 42 may include a single processor with multiple cores or multiple processors (with single or multiple cores). The processing unit 42 interacts with the communication subsystem 43 to perform communication functions via the network 10 with other systems, servers and/or devices such as the mobile devices 20.

In at least some embodiments, the server 40 may have access to or implement an indoor positioning system for the facility 110. The server 40 may connect to and retrieve location data for the mobile devices 20 from an indoor positioning system. The indoor positioning system may, for example, be a system based on wireless AP fingerprints within the facility 110. The server 40 may itself implement the indoor positioning system or request location data associated with one or more mobile devices 20 from a separate indoor positioning system. That is, the location associated with a mobile device 20 in the facility 110 may be determined directly by the server 40 or a separate system to which the server 40 has access for sending and retrieving data.

Registration of Asset Tags

Figure 2:
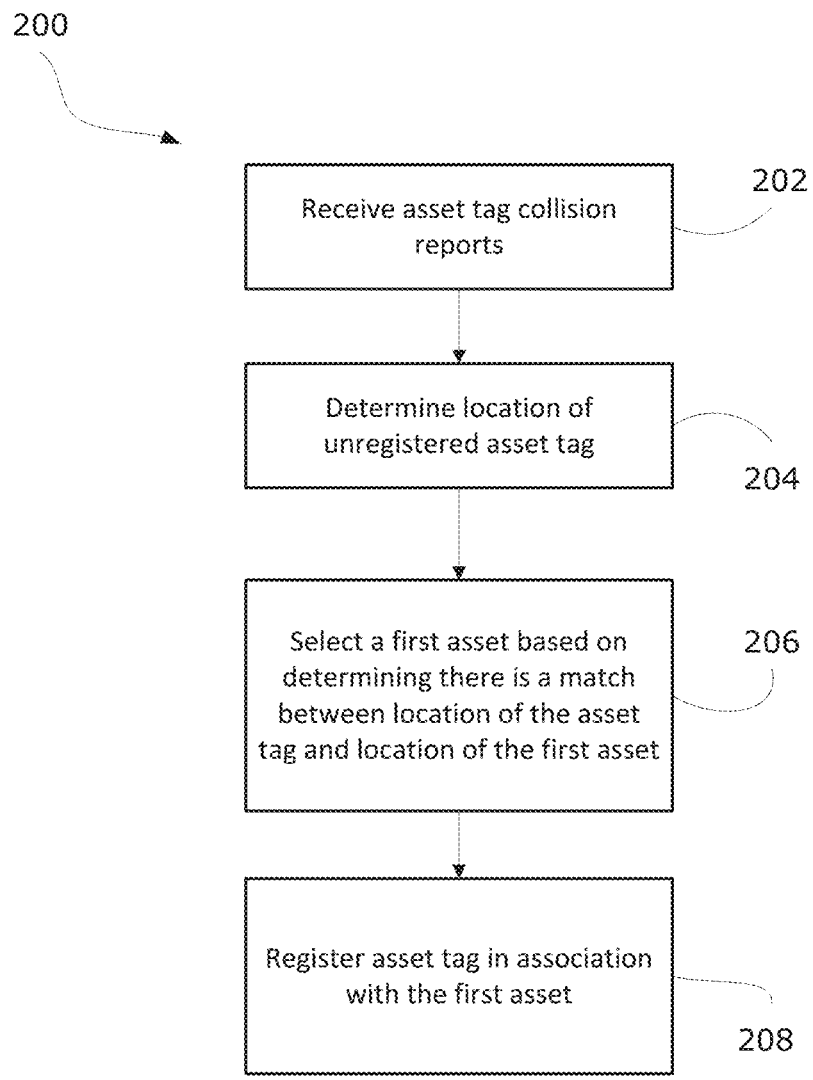
FIG. 2 shows, in flowchart form, an example method for registering an asset tag in accordance with example embodiments of the present disclosure.

Reference is now made to FIG. 2, which shows, in flowchart form, a server-implemented method for automatically registering an asset tag in association with an asset in a database. In at least some embodiments, the method 200 may be implemented by a server, such as the server 40 of FIG. 1. By way of example, the method 200 may be implemented by a Mobile Device Management server which manages a plurality of mobile devices deployed in an enterprise environment. In particular, the server is communicably connected to the mobile devices in an indoor facility of an enterprise via a wireless network, such as a WLAN.

An asset tag associated with a deployed asset is configured to broadcast wireless signals to enable tracking of the asset. For example, processing circuitry of the asset tag may cause one or more wireless transceivers of the asset tag to broadcast wireless beacon signals. In at least some embodiments, the wireless transceiver of the asset tag may broadcast signals when the asset is first deployed in the indoor facility. In particular, the asset tag may be affixed to the asset at the time the asset is deployed. Broadcasting by the asset tag upon first deployment of the asset may allow the asset to be tracked from the start of its deployment and facilitate the server's determination of an initial location of the asset. In some other embodiments, wireless signals may be broadcast by an asset tag when the asset tag first becomes operational. For example, if the asset is retrofitted with an asset tag after the asset had already been deployed in the indoor facility, when the asset tag is first activated, the processing circuitry may cause wireless beacon signals to be broadcast.

The signals transmitted by an asset tag may represent various different types of data. In particular, a broadcast signal may represent data about the asset tag, including, without limitation: identifier of the asset tag; product or manufacturer code; current battery status; and time of transmission of the wireless signal. In some embodiments, the broadcast signal may represent other information relating to the asset tag and/or the associated asset. For example, the signal may indicate that there is some problem with the asset (e.g. asset is being removed from a designated space) or the asset tag (e.g. asset tag is malfunctioning).

In at least some embodiments, transmission of the broadcast signal may occur continuously at a predetermined rate. In particular, the processing circuitry of the asset tag may be programmed to establish a fixed transmission rate for the broadcast signal and to control the wireless transceiver to broadcast at the fixed rate.

In some embodiments, the transmission rate may be variable. For example, the transmission rate may depend, in part, on the remaining charge for the battery associated with the asset tag. If the remaining charge of the battery falls below a threshold level, the transmission rate of the broadcast signal may be decreased. In some embodiments, the transmission of the wireless signal may switch between a fixed rate and a variable rate. The asset tag may continue to broadcast the signal until an explicit instruction is received to cease transmission of the signal. A degree of randomness in the frequency of broadcasts may be employed for collision avoidance in some embodiments.

One or more mobile devices that come within range of a signal broadcast by the asset tag may detect the signal. It will be appreciated that both stationary (i.e. at-rest) and moving/travelling devices within the indoor facility may be capable of detecting the broadcast signal from the asset tag. Upon detecting a broadcast signal from the asset tag, a mobile device may generate an asset tag collision report. An asset tag collision report is generated by a mobile device following detection of, or "collision" with, a wireless signal broadcast by an asset tag. In particular, an asset tag collision report includes an identifier of the asset tag associated with a tracked asset. As a mobile device may detect a plurality of broadcast signals transmitted by the asset tag, an asset tag collision report may include a timestamp associated with each signal received by the mobile device from the asset tag. The asset tag collision report may also include an RSSI associated with each of the received signals. In some embodiments, the mobile device may generate one asset tag collision report for each received broadcast signal from the asset tag. In particular, each time a broadcast signal from the asset tag is detected, the mobile device may generate an asset tag collision report, indicating, at least, a timestamp and an RSSI associated with that signal. In some other embodiments, the mobile device may generate one asset tag collision report that contains data for a plurality of received broadcast signals. The asset tag collision report may also include an identifier of the mobile device that generated the report. That is, the asset tag collision report may indicate the identity (e.g. device ID/user/etc.) of a reporting mobile device from which the asset tag collision report originated.

In at least some embodiments, an asset tag collision report may specify a location of a mobile device associated with a time at which a broadcast signal from the asset tag is received by the mobile device. That is, the asset tag collision report may identify a location within the indoor facility at the time when the mobile device detected a broadcast signal transmitted by the asset tag. For example, the location information provided in an asset tag collision report may indicate a defined area (e.g. room) of the indoor facility in which the mobile device is located when a signal from the asset tag is detected.

When a broadcast signal is detected by a mobile device, an indoor positioning application on the mobile device may be used to identify a location of the mobile device associated with the timestamp for the detection of the signal. Where an asset tag collision report includes data for multiple received broadcast signals, the report may indicate a location of the mobile device associated with each of the received signals. In some embodiments, the asset tag collision report may include data that can be used by an indoor positioning system to determine a location of the mobile device within the facility at the time when the mobile device detected a broadcast signal from the asset tag, without expressly indicating a specific location of the mobile device within the facility. For example, the asset tag collision report may include RSSI measurements for wireless signals from a plurality of APs that are received by the mobile device, which measurements can be used by an indoor positioning system to identify a specific location in the indoor facility. In some embodiments, the server may be configured to determine a three-dimensional position of the reporting mobile device within a defined area of the facility. For example, an asset tag collision report from a mobile device may indicate a height of the mobile device above ground when a signal from an asset tag is received at the mobile device or include RSSI measurements for signals from APs which allow a server to compute the height of the mobile device above ground.

Mobile devices that detect wireless signals broadcast by an asset tag generate and transmit asset tag collision reports to a server. More specifically, in operation 202, a server (e.g. MDM server) receives one or more asset tag collision reports from at least one mobile device in the indoor facility. The server may receive asset tag collision reports from multiple different reporting devices which encounter broadcast signals from the asset tag, or receive multiple asset tag collision reports from a single reporting device that detects broadcast signals from the asset tag.

In operation 204, the server determines the location of the asset tag in the facility based on the one or more received asset tag collision reports. In at least some embodiments, the server may determine the locations of reporting mobile devices that transmit asset tag collision reports to the server. For example, if an asset tag collision report includes an identifier of the mobile device that transmitted the report, the server may use an indoor positioning system for the facility to determine the location of the mobile device based on the identifier. In some other embodiments, an asset tag collision report may itself indicate the location of the mobile device that transmitted the report.

The server may have access to a collisions history record of all asset tag collision reports received from mobile devices in a facility. For example, the server may maintain a collisions history record in which the entries are organized by timestamps associated with detected signals (e.g. time of transmission of broadcast signal by asset tag) as indicated in the received asset tag collision reports. In particular, for each time, the collisions history record may specify the identities of the mobile devices that detected a signal broadcast by the asset tag, as well as other relevant information about the respective received signal (e.g. RSSI). Where an asset tag collision report includes the location of the mobile device that generated and transmitted the report, the collisions history record maintained by the server will also specify the location of the mobile device in association with the time at which the mobile device detected a broadcast signal from the asset tag. Based on this crowd-sourced approach, the server may be able to collect sufficient amount of data from the asset tag collision reports to develop and refine an estimate of a location of the asset tag within the facility. That is, determining the location of the asset tag may comprise obtaining an estimate of the location based on data accumulated from the received asset tag collision reports.

A technique which may be employed for deriving estimates of the asset tag's location is trilateration. Given two independent measurements of distance from the asset tag to mobile devices with known locations, the location of the asset tag can be narrowed to two possibilities, and any additional information (e.g. a third distance measurement to a third mobile device with a known location) may uniquely identify the asset tag's location. In some embodiments, the system may use one or more signal parameters to assist in location determination. For example, an RSSI for the signal broadcast by the asset tag may be used to determine an estimated distance to a receiver from the source of the signal. While accurate distances may generally not be obtained using signal parameters alone, several indoor localization systems based on signal parameters have been successfully implemented. Such systems are described in, at least, "An indoor bluetooth-based positioning system: Concept, implementation and experimental evaluation." (Silke Feldmann, Kyandoghere Kyamakya, Ana Zapater, and Zighuo Lue. *International Conference on Wireless Networks*, pages 109-113, 2003), "Indoor localization using Bluetooth." (Tiago Fernandes., *6th Doctoral Symposium in Informatics Engineering*, pages 480-483, 2011), both of which are incorporated herein by reference. A simplified distance estimation model is given in "Accuracy of Location Identification with Antenna Polarization on RSSI" (Xu Huang, Mark Barralet, Dharmendra Sharma. *Proceedings of the International Multi- Conference of Engineers and Computer Scientists*, 2009) by equation (1):

$$RSSI = -(10 \times n)\log_{10} d - A \qquad (1)$$

where RSSI is measured in dBm, n represents a path loss exponent (which depends on the propagation characteristics of the received signal), d is distance in meters between a transmitter and a receiver and A is a reference RSSI at a distance of 1 meter from the transmitter. In order to use equation (1), the values of n and A may be determined empirically. Other localization algorithms using trilateration may be used by the server to develop estimates of the location of the asset tag based on data from a plurality of (i.e. at least three) asset tag collision reports.

With each receipt of an asset tag collision report, the server may use the additional data from the report to refine the computation of an estimate of the asset tag's location. In at least some embodiments, the server may include an asset tag location estimation module that is configured to apply a suitable localization algorithm to data from a plurality of received asset tag collision reports. For a specific timestamp in the collisions history record maintained by the server, the server may use the one or more entries corresponding to the timestamp to determine the location of a mobile device that detected a broadcast signal from the asset tag and an RSSI of the detected broadcast signal. The server may extract the location information of the mobile device from the asset tag collision report itself or access an indoor positioning system for the facility in order to identify a location corresponding to the mobile device using the device's identifier (specified in the asset tag collision report). For example, if the asset tag collision report includes RSSI measurements for wireless signals received by the mobile device from a plurality of APs within the facility, the indoor positioning system may correlate the RSSI measurements with wireless AP fingerprints for the facility in order to determine the location of the mobile device. The location of the mobile device and the RSSI of the broadcast signal from the asset tag that the mobile device detects can be input to the asset tag location estimation module to determine the location of the asset tag at the relevant time.

In some cases, the server may not have sufficient data for a trilateration-based localization technique. For example, the server may receive no more than two asset tag collision reports from mobile devices in the facility. In such cases, the server may be configured to collect context data about the facility to determine an estimated location of the asset tag. For example, if the server only receives location data from two mobile devices detecting a broadcast signal, reducing the number of possible locations of the asset tag to two, the server may access an indoor positioning system for the facility and determine that one of the possibilities is an inaccessible location, thus eliminating the possibility as a viable location for the asset tag. As a further example, the server may reject those scenarios in which an asset tag is determined to be possibly located in a washroom or an unoccupied space (e.g. vacant room) in the facility. In some embodiments, the server may extrapolate a location of an asset tag by forming a trajectory of the asset tag's traveled path or by using a dead reckoning technique.

Even if highly accurate measurement of distances is not obtained based on the RSSI measurements, the server may nevertheless be capable of identifying a defined area of the facility in which the asset tag is located. In particular, the server may be able to localize the asset tag to floor- or room-level. That is, even if the exact location of the asset tag within the facility cannot be derived based on data from the asset tag collision reports, a room (or passage, workspace, etc.) in which the asset tag is located may be determined (for example, through trilateration and contextual deduction).

In formulating estimates of the location of an asset tag based on data from a plurality of asset tag collision reports, the server may be configured to apply suitable weightings to received signal measurement data. In particular, in a triangulation-based localization algorithm, the server may place greater weight on the locations of some reporting mobile devices than the locations of other reporting mobile devices. For example, if a particular mobile device receives multiple (i.e. two or more) signals from an asset tag, the location(s) of that mobile device may be accorded more weight in a localization algorithm than another mobile device which reports only a single detected signal from the asset tag. By way of further example, if a mobile device reports a high magnitude RSSI for a received signal, greater weight may be placed on the location(s) of that mobile device compared to other mobile devices. Other criteria for distribution of weights to the locations of different reporting devices in the server's localization algorithm may be available.

In operation 206, the server selects a first asset from a set of one or more unregistered assets that are known to be or identified as being deployed in the indoor facility, based on determining that there is a match between the location of the asset tag and location information associated with the first asset. Similar to the server 40 of FIG. 1, the server has access to an assets database which stores information associated with assets that are known to be deployed in the facility. In particular, the assets database contains, among others, information relating to deployed assets that are yet to be registered in association with an asset tag. For example, the assets database may indicate, for each of a plurality of deployed assets, a registration status of the asset. In at least some embodiments, the assets database may specify, for each unregistered asset, a defined area (e.g. room) in the facility in which the unregistered asset is located. When the server determines that an asset tag is located in a certain defined area (i.e. based on asset tag collision reports transmitted by one or more mobile devices), and if the defined area is known to contain only a single unregistered asset, the asset tag and the unregistered asset in the defined area can be paired. That is, the server may select the unregistered asset located in the defined area as the asset to be paired with the asset tag.

Where an asset tag is determined to be in a certain defined area, but the defined area is known to contain two or more unregistered assets, the server may use contextual data relating to the unregistered assets and/or the defined area to deduce an appropriate pairing of the asset tag with an asset. For example, if an unregistered asset tag is determined to be located in a particular room, and an assets database indicates that the room holds a plurality of unregistered assets, the server may attempt to match the asset tag with one of the plurality of unregistered assets. In at least some embodiments, the server may have access to floor plans of the facility that provide various information about a defined area (e.g. room, passage, etc.) such as its location, type/purpose, dimensions, and boundaries.

In at least some embodiments, the type/class of an asset, as indicated in an assets database, may be used to inform where the asset is likely to be located in a defined area. For example, assets that are used for visual display of information, such as flat-panel displays, projector screens, etc., are often positioned on or proximal to one of the interior walls of a room. If an asset tag is determined to be near an interior wall of the room and at least one of the unregistered assets in the room is a visual display device, the server may match/assign the asset tag to the unregistered display device or, at least, reduce the number of possible assets which may be paired with the asset tag. As a further example, assets such as fire extinguishers and wall-mount phones may often be located near an entrance/exit of a room. Thus, if an asset tag is determined to be near an entrance/exit, the server may select the appropriate asset that is likely to be by the entrance/exit as the asset to be paired with the asset tag. Other structural features of a defined area, such as windows, closets, etc., which may be identified by the server based on information that is accessible to the server (e.g. detailed floor plans) may inform the process of matching asset tags with contextual data associated with unregistered assets.

In some cases, the server may detect that there are two or more unregistered asset tags in a single defined area. For example, a plurality of asset tag collision reports transmitted by mobile devices in a single room may indicate the presence of two or more different asset tags that have not been registered (i.e. the asset tag identifiers are not stored in database). In such scenarios, the server may use information identifying the relative locations of the unregistered asset tags to deduce appropriate pairings with assets in the defined area. For example, if two or more asset tags are located near an entrance/exit to a room, the server may determine which of the assets tags is positioned closest to the entrance/exit and designate that asset tag as being associated with an asset that is known to be typically located by entrances/exits (e.g. fire extinguisher).

In operation 208, the asset tag is registered in association with the selected first asset in a database. In at least some embodiments, when an appropriate pairing of an unregistered asset tag with a first asset is determined by the server, the server may update an assets database, such as database 45 of FIG. 1, by indicating the association between the asset tag and the first asset in the database.

Figure 3:
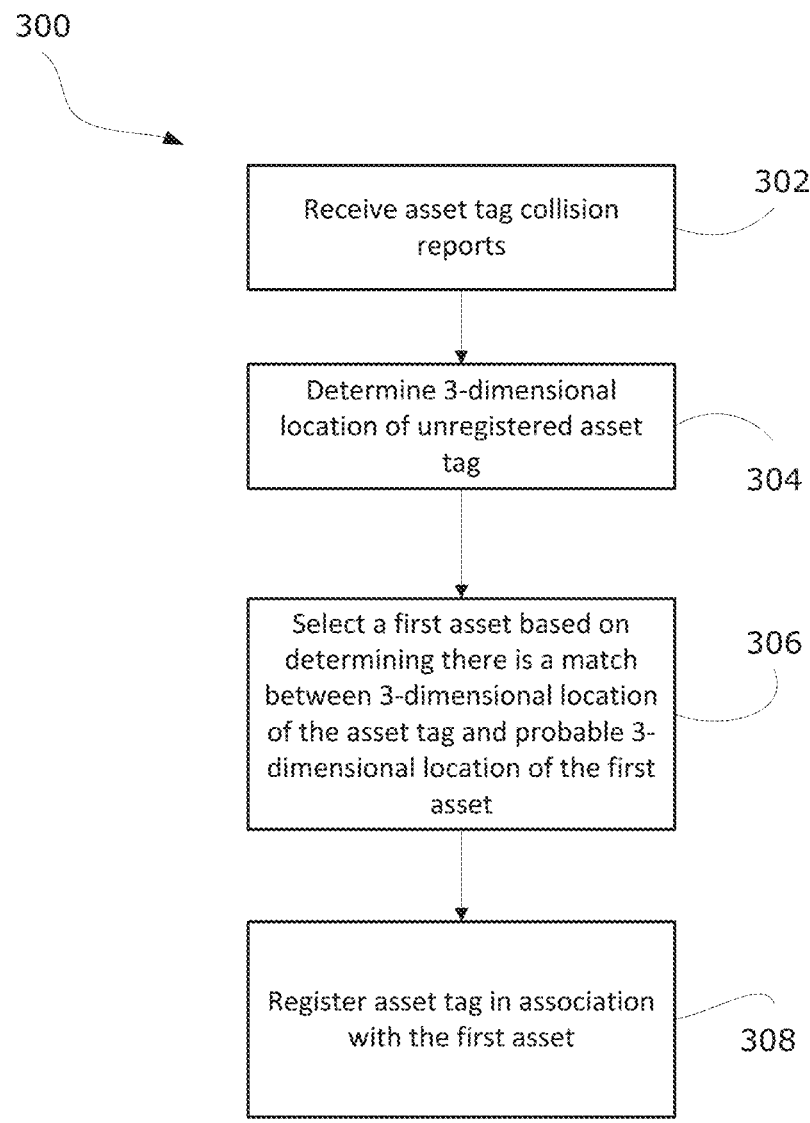
FIG. 3 shows, in flowchart form, another example method for registering an asset tag in accordance with example embodiments of the present disclosure.

Reference is now made to FIG. 3, which shows another example method 300 for automatically registering an asset tag in association with a tracked asset. In at least some embodiments, the method 300 is implemented by a server, such as server 40 of FIG. 1.

Operation 302 of method 300 corresponds to the operation 202 of FIG. 2. More specifically, the server receives one or more asset tag collision reports from at least one mobile device that detects wireless broadcast signals transmitted by an unregistered asset tag. For example, the server may receive asset tag collision reports from one or more mobile devices that are either located inside or in the vicinity of a defined area (e.g. room) in which an asset tag is located. In operation 304, the server determines a three-dimensional position of the asset tag in the defined area within which the asset tag is located. In particular, based on a plurality of received asset tag collision reports, the server may determine a height of the asset tag above ground in the defined area. For example, if the server is able to determine the three-dimensional positions (e.g. height) of those mobile devices that report collisions with an unregistered asset tag, an approximate three-dimensional position of the asset tag within a room may be computed by the server, based on the RSSI of signals received by the reporting mobile devices from the asset tag (i.e. according to a collisions history record compiling data from multiple asset tag collision reports). In some cases, the height of the asset tag may be computed as a relative height. For example, the server may be able to infer that a certain unregistered asset tag is located at a higher/lower altitude relative to a reporting mobile device, a registered asset, another unregistered asset tag, etc. As another example, the height of an asset tag may be expressed in other relative terms: an asset tag may be closer to the ceiling than to the floor, closer to the floor than the ceiling, etc.

In operation 306, the server selects a first asset to be paired with the unregistered asset tag based on determining that there is a match between the three-dimensional position of the asset tag and a probable three-dimensional location of the first asset. In particular, the server determines a probable three-dimensional position of the first asset based on known information, such as information stored in an assets database, about the first asset. For example, assets such as overhead projectors or light fixtures are likely to be positioned near the ceiling of a defined area. That is, based on the type/class of an asset, the probable three-dimensional position of the asset may be determined, either in absolute or relative terms. Thus, if a room in a facility is known to contain an overhead projector or light fixtures, an unregistered asset tag which is positioned at a height that is close to the ceiling of the room may be paired with the projector/fixtures.

In some embodiments, the probable three-dimensional position of an asset in a defined area may be inferred based on the position and/or dimensions of other assets that are known to be located in the same defined area. For example, if a table is known to be located in a certain room and its height and/or position is known (i.e. stored in the assets database) or can be estimated, the relative three-dimensional positions of assets that typically accompany the table (e.g. conferencing phone, chairs, etc.) can be ascertained. Thus, the probable position of, for example, a conferencing phone in a room may be characterized as being higher than table-level. In similar manners, a flat-panel display (e.g. television monitor) may be associated with a position that is higher than table-level and proximal to an interior wall of the room, and a projector device that is transported throughout a facility using a registered cart/stand may be associated with a position that is higher than a known height of the cart/stand.

It should be noted that an asset is not required to be known or stored in a database for the asset to be paired with an unregistered asset tag. That is, an asset tag may be connected to an asset that is not known to be or identified as being deployed in the facility and the present system and methods may still provide useful tracking information for the unknown asset. For example, a boardroom in a facility is likely to hold, at least, a centrally disposed table and a plurality of chairs positioned along the periphery of the table. If an unregistered asset tag is determined to be located in the boardroom and is not located generally near a center of the room, the server may infer that the asset tag is associated with one of the plurality of chairs. Even if the chair to which the asset tag is connected cannot be identified exactly, knowing the class of asset that is tracked using the asset tag may prove useful. For example, if after registration of the asset tag, the asset tag is detected as being moved out of the boardroom, an asset tracking and management system may be so notified (i.e. a chair has been taken from the boardroom and moved to room X). Thus, the registration of an asset tag in association with an asset class/type can sometimes provide useful information for tracking assets in a facility. Furthermore, information about assets that are known to be or identified as being deployed in a certain defined area can be used for determining the location and/or identity of an unregistered asset. For example, if a registered asset (e.g. desktop computer) that is typically accompanied by or used in conjunction with another unregistered asset (e.g. monitor) is known to be in a room, even if the unregistered asset is not identified as being present in the room (for example, in an assets database), the server may be able to deduce that an asset tag that is transmitting broadcast signals from the room is associated with the unknown, unregistered asset.

In operation 308, the server registers the asset tag in association with the selected first asset in a database, such as assets database 45 of FIG. 1. It will be appreciated that one of the uses for a collisions history record is determining whether a detected asset tag is being removed from a defined area. In particular, even if an asset tag is not registered in association with a specific asset or asset class, mobile devices that detect signals broadcast by the asset tag may be able to provide information for the server to determine whether the asset tag is leaving a defined area. For example, if an asset tag is determined to be in motion (e.g. based on RSSI measurements received by stationary mobile devices) and nearing an exit of a room, it may be inferred that the asset tag (and by association, the tracked asset) is about to be removed from the room. In response to such detection by the server, an asset tracking system may be configured to prompt a user device, employee, etc. that is currently near the asset tag to ensure that the asset tag is registered before relocation. In some embodiments, various geo-fences may be defined within a facility such that relocation of unregistered asset tags can trigger generation of notifications or alerts to cause the asset tags to be properly registered.

Figure 4:
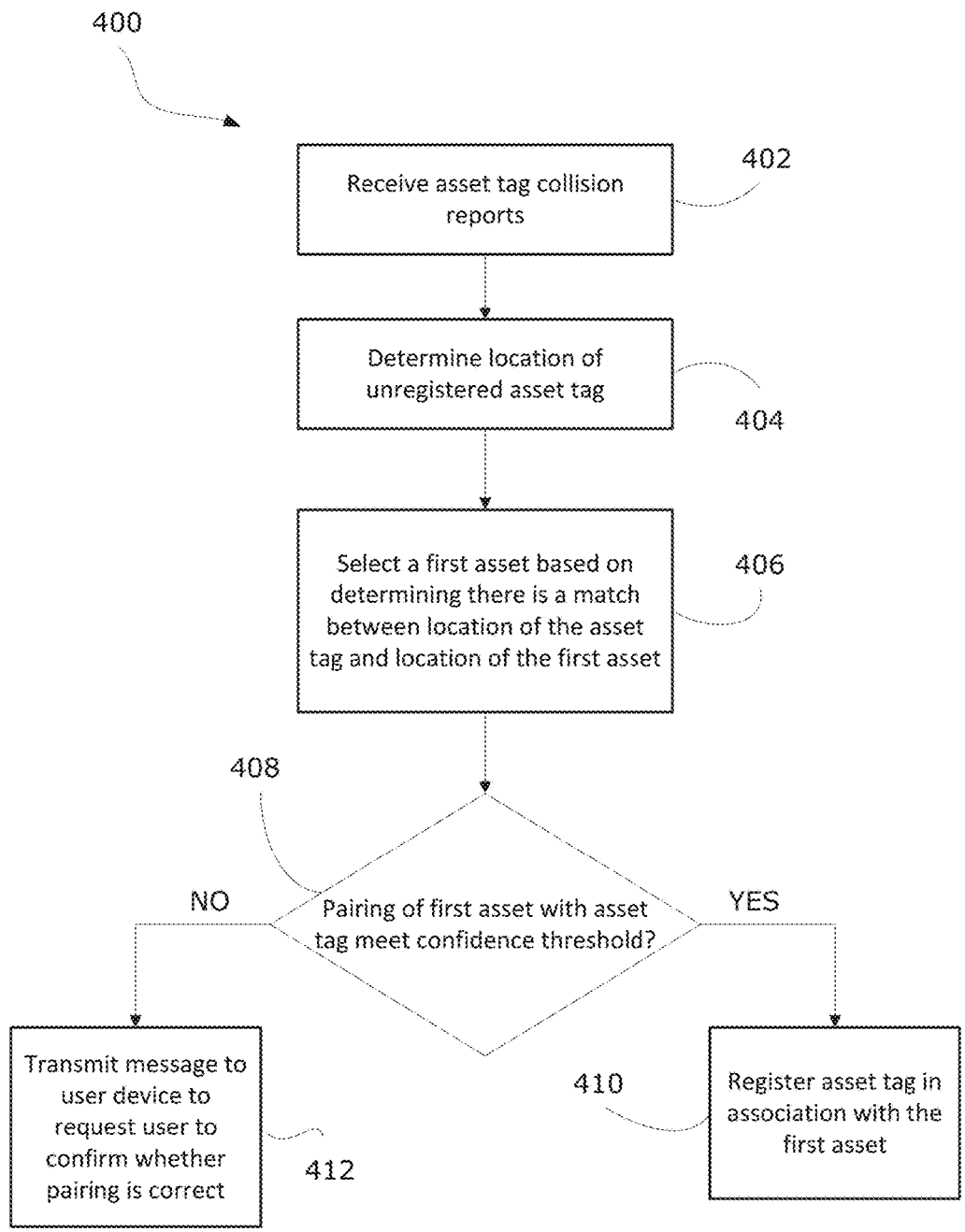
FIG. 4 shows, in flowchart form, another example method for registering an asset tag in accordance with example embodiments of the present disclosure.

Reference is now made to FIG. 4, which shows another example method 400 for automatically registering an asset tag in association with a tracked asset. In at least some embodiments, the method 400 is implemented by a server, such as server 40 of FIG. 1.

Operations 402, 404 and 406 of method 400 correspond to operations 202, 204 and 206 of method 200, respectively. In particular, the server selects a first asset that is to be paired with an unregistered asset tag, based on determining that there is a match between the location of the asset tag and the location of the first asset, in operation 406. In operation 408, the server determines whether the pairing of the selected first asset and the unregistered asset tag meets a predefined confidence threshold. This determination in operation 408 may comprise a check of the accuracy of the determined location of the asset tag and/or a check of the accuracy of a pairing of an unregistered asset tag with an asset, as will be explained in greater detail below.

In at least some embodiments, in operation 408, the server may perform a check to determine whether an estimate of the location of the asset tag satisfies a pre-determined confidence threshold. Various confidence thresholds may be appropriate for estimating the location of an asset tag. For example, the confidence threshold may be satisfied if more than a threshold number of asset tag collision reports from different mobile devices is received by the server for a certain time. As a further example, if more than a threshold number of signals is received by a single mobile device, the mobile device may correspond to a user who is physically moving the asset associated with the asset tag, suggesting that an estimate of the asset tag's location based on a current location of the user's mobile device is likely to be accurate. The server may also consider other factors in determining that an estimate of the asset tag's location is confidently correlated to its actual location, including the state of motion of the asset tag (i.e. whether the asset is in motion or at rest) and magnitude of RSSI of received signals. In some embodiments, a memory associated with the server may store one or more pre-determined rules regarding confidence thresholds for estimates of an asset tag's location.

When a certain defined area is known to contain a plurality of unregistered assets, it may be difficult to determine an accurate pairing of an unregistered asset tag with one of the plurality of assets in the defined area. For example, if multiple different assets are positioned close together in a room, have similar three-dimensional positions (e.g. similar heights), or are of similar or same type/class, it may not be possible to derive a pairing of an unregistered asset tag with one of the multiple assets to a desirable degree of accuracy. In particular, an accurate pairing may not be possible based on location metrics or available contextual data about the defined area and the assets. In at least some embodiments, the server may perform a check to determine whether a pairing of an unregistered asset tag with a selected asset meets a confidence threshold. For example, a confidence metric/value associated with a pairing may be derived based on numerous factors, including, but not limited to: type/identity of defined area; class of selected asset; three-dimensional position of the selected asset; number of unregistered assets in the same defined area as the selected asset; and number of unregistered assets of the same class as the selected asset in the defined area.

If the pairing of the selected first asset with the unregistered asset tag is determined to satisfy a suitable confidence threshold, the server is configured to register the asset tag in association with the first asset, in operation 410. If, on the other hand, the pairing does not meet the confidence threshold, the server may transmit messages to one or more user devices deployed in the facility, requesting users of the user devices to confirm whether the pairing is correct, in operation 412. In particular, the server may be configured to automatically send requests to people who are in the vicinity of the asset tag to verify that the asset tag has been correctly paired with the asset that it is tracking. In at least some embodiments, the server may transmit messages to user devices which are determined to be in close proximity to the asset tag. The server may select such user devices by, for example, accessing an indoor positioning system to locate those mobile devices whose locations are proximal to the location of the asset tag. For example, the user devices may include mobile devices that are determined to be in the same room (or passage, etc.) of the facility as the asset tag. As a further example, the user devices may include those mobile devices from which the server received asset tag collision reports based on collisions with the asset tag.

The messages requesting confirmation of tag-to-asset pairings can be presented on user devices in various different ways. For example, the messages may be in the form of emails, pings, or mobile app notifications. In particular, a mobile app may be used to confirm a tag-to-asset pairing. Use of such mobile apps may, for example, be managed by an MDM solution, such as an MDM server for an enterprise. In some embodiments, the graphical user interface of a user device may present a list of unregistered assets and one or more asset tags that have been detected (for example, based on asset tag collision reports). Identifying information for the assets, such as asset class, device ID (e.g. serial number), etc., as well as for the asset tag may be displayed.

These confirmation messages may be sent to user devices at various different times or upon occurrence of one or more predefined events. In some embodiments, the messages may be sent to user devices that enter into and/or currently occupy a defined area in which an unregistered asset tag is located. For example, user devices of employees attending a meeting in a boardroom may be notified with requests to confirm possible tag-to-asset pairings for the asset tags that are determined to be in the boardroom. In some embodiments, the confirmation messages may be sent after a predetermined number of asset tag collision reports corresponding to an unregistered asset tag are received at the server. For example, confirmation messages may not be sent until at least a threshold number of asset tag collision reports for an asset tag are received. In this way, the server may be given an opportunity to collect sufficient amount of data to perform the deduction of a tag-to-asset pairing on its own, without having to rely on confirmation from user devices.

A user may input various information to reply to requests for a tag-to-asset pairing confirmation. For example, various input interfaces of a user device may be used for selection and textual input. In some embodiments, a user device may be used to add previously unknown assets to a database of deployed assets, by associating with an asset tag that is detected by the user device. For example, when a user device detects signals broadcast by an asset tag but the asset corresponding to the asset tag is not known to the server (i.e. not stored in an assets database), the user device may be presented with an option to manually register the asset tag by adding the associated asset to the database of deployed assets. The user may, for example, capture an image of a barcode (e.g. Universal Product Code, two-dimensional barcode, etc.) associated with an asset and/or an asset tag in confirming a tag-to-asset pairing or registering a previously unknown asset.

The confirmation messages can be sent to multiple different user devices which may improve the reliability of tag-to-asset pairing verifications. In at least some embodiments, the server may register an asset tag in association with an asset upon receiving at least a predefined threshold number of confirmations from user devices regarding the tag-to-asset pairing. If an indication is received from one or more user devices that a certain tag-to-asset pairing is incorrect, the server may be configured to automatically select a second unregistered asset that is known to be or identified as being deployed in the facility and register the asset tag in association with the second asset. For example, if a user indicates that a pairing of an asset tag with a first asset is incorrect, the server may present the user with a list of one or more unregistered assets that are likely to be associated with the detected asset tag, such as those unregistered assets which may be in the same defined area as the first asset. In some embodiments, the server may be configured to rank a set of unregistered assets according to their likelihood of being associated with a particular asset tag. Such ranking may be defined based on data from one or more received asset tag collision reports, and may usefully guide a user in finding the asset that is associated with an asset tag. Alternatively, the user may be requested to manually enter identifying information for the asset that is associated with the asset tag. For example, if the asset tag is not associated with any of the known deployed assets or if it is more expedient for a user to manually enter a tag-to-asset pairing (e.g. when there is a large number of possible pairings), the user may optionally input the correct pairing information as a response to a request for confirmation from the server.

By collecting data from a plurality of asset tag collision reports that are based on collision with signals from an asset tag, the server can maintain a record of signal detection events for the asset tag. Based on this record of signal detection events, the server can obtain estimates of the location of the asset tag. For example, if the server has location information for three or more devices that each detected a broadcast signal from the asset tag at a given time (or a range of time) and the signal strength information (i.e. RSSI) of the signal detected by the respective devices, the server can perform trilateration to determine an estimate of the location of the asset tag at the given time (or range of time). Using a crowd-sourced approach, the server can receive asset tag collision reports from a plurality of mobile devices or a plurality of asset tag collision reports from a single device to develop and refine an estimate of the asset tag's location within the facility. The location of the asset tag can, in turn, be matched to the location or probable location of an unregistered asset based, at least in part, on known contextual data relating to the asset and/or the defined area in which the asset tag is known to be located.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The subject-matter of the disclosure also relate, among others, to the following aspects and clauses:

Clause 1. A server-implemented method for registering an asset tag in a database, the asset tag being used to track a location of an asset in an indoor facility, the method comprising:
  receiving, from at least one mobile device connected to the server via a wireless communication network, one or more asset tag collision reports, each of the one or more asset tag collision reports including a tag identifier of the asset tag, wherein the tag identifier is transmitted to the at least one mobile device in wireless signals broadcast by the asset tag;
  determining a location of the asset tag based on the one or more received asset tag collision reports;
  selecting a first asset from a set of one or more unregistered assets that are identified as being deployed in the indoor facility based on determining that there is a match between the location of the asset tag and location information associated with the first asset; and
  registering the asset tag in association with the first asset in the database.

Clause 2. The method of clause 1, wherein the location information associated with the first asset is retrieved from an assets database storing information associated with the one or more unregistered assets that are identified as being deployed in the indoor facility.

Clause 3. The method of either clause 1 or 2, wherein determining the location of the asset tag comprises identifying a defined area of the indoor facility in which the asset tag is located.

Clause 4. The method of any one of clauses 1 to 3, wherein the defined area is a room in the indoor facility.

Clause 5. The method of any one of clauses 1 to 4, wherein determining the location of the asset tag comprises identifying a three-dimensional location of the asset tag within the defined area and wherein selecting the first asset comprises determining a probable three-dimensional location of the first asset based on a type associated with the first asset.

Clause 6. The method of any one of clauses 1 to 5, wherein the probable three-dimensional location of the first asset indicates a probable height of the first asset above ground and wherein determining that there is a match comprises determining that the probable height of the first asset above ground matches a height of the asset tag above ground within the defined area.

Clause 7. The method of any one of clauses 1 to 6, wherein each of the one or more asset tag collision reports indicates an identity of a reporting mobile device from which the asset tag collision report originated.

Clause 8. The method of any one of clauses 1 to 7, wherein the asset tag collision report identifies a location of the reporting mobile device within the indoor facility at a time when a wireless signal from the asset tag was detected by the reporting mobile device.

Clause 9. The method of any one of clauses 1 to 8, wherein the location of the reporting mobile device within the indoor facility is determined by the reporting mobile device using an indoor positioning application.

Clause 10. The method of any one of clauses 1 to 9, wherein the identified location specifies a defined area of the indoor facility.

Clause 11. The method of any one of clauses 1 to 10, wherein the asset tag collision report includes a timestamp indicating a time at which the wireless signal from the asset tag was detected by the reporting mobile device.

Clause 12. The method of any one of clauses 1 to 11, wherein the asset tag collision report includes a received signal strength indicator (RSSI) of the wireless signal detected by the reporting mobile device.

Clause 13. The method of any one of clauses 1 to 12, further comprising:
  determining that a pairing of the first asset with the asset tag does not meet a predefined confidence threshold; and
  in response, transmitting messages to one or more user devices to request users of the user devices to confirm whether the pairing is correct.

Clause 14. The method of any one of clauses 1 to 13, wherein the one or more user devices comprise devices which are determined to be in close proximity to the asset tag.

Clause 15. The method of any one of clauses 1 to 14, wherein the one or more user devices comprises devices which are determined to be in a defined area of the indoor facility in which the asset tag is located.

Clause 16. The method of any one of clauses 1 to 15, wherein the one or more user devices comprise devices from which one or more of the asset tag collision reports originated.

Clause 17. The method of any one of clauses 1 to 16, further comprising:
  receiving, from at least one of the one or more user devices, a message indicating that the pairing is incorrect;
  in response,
    selecting a second asset from the set of one or more unregistered assets that are identified as being deployed in the indoor facility; and
    registering the asset tag in association with the second asset in the database.

Clause 18. The method of any one of clauses 1 to 17, further comprising maintaining a record of the one or more received asset tag collision reports.

Clause 19. A system comprising:
  an asset tag for use in tracking a location of an asset in an indoor facility;
  at least one mobile device configured to detect wireless signals broadcast by the asset tag; and
  a server connected to the at least one mobile device via a wireless communication network, wherein the server is configured to:
    receive, from the at least one mobile device, one or more asset tag collision reports, each of the one or more asset tag collision reports including a tag identifier of the asset tag, wherein the tag identifier is transmitted to the at least one mobile device in wireless signals broadcast by the asset tag;
    determine a location of the asset tag based on the one or more received asset tag collision reports;
    select a first asset from a set of one or more assets that are identified as being deployed in the indoor facility based on determining that there is a match between the location of the asset tag and location information associated with the first asset; and
    register the asset tag in association with the first asset in a database.

Clause 20. A non-transitory computer-readable medium storing processor-executable instructions for a server to register an asset tag in a database, wherein the instructions comprise:
  instructions to receive, from at least one mobile device connected to the server via a wireless communication network, one or more asset tag collision reports, each of the one or more asset tag collision reports including a tag identifier of the asset tag, wherein the tag identifier is transmitted to the at least one mobile device in wireless signals broadcast by the asset tag;
  instructions to determine a location of the asset tag based on the one or more received asset tag collision reports;
  instructions to select a first asset from a set of one or more unregistered assets that are identified as being deployed in an indoor facility based on determining that there is a match between the location of the asset tag and location information associated with the first asset; and
  instructions to register the asset tag in association with the first asset in the database.

The invention claimed is:

1. A method for registering an asset tag in a database, the method comprising:
  receiving, from at least one mobile device, one or more asset tag collision reports, each of the one or more asset tag collision reports including a tag identifier of the asset tag, wherein the tag identifier is transmitted to the at least one mobile device in wireless signals broadcast by the asset tag;
  determining a location of the asset tag based on the one or more received asset tag collision reports; and
  registering the asset tag in association with the tag identifier and the determined location in the database.

2. The method of claim 1, further comprising determining, based on the location, one or more classes of assets, and wherein registering further includes registering the asset tag in association with said one or more classes of assets.

3. The method of claim 2, wherein the determining the one or more classes of assets is based on the determined location and contextual data regarding the location.

4. The method of claim 3, wherein the determined location includes a determined height and wherein the contextual data includes data per class prescribing likely height of an asset of that class.

5. The method of claim 1, wherein determining the location of the asset tag includes identifying a defined area of the indoor facility in which the asset tag is located.

6. The method of claim 1, wherein registering the asset tag further includes identifying an unregistered asset having associated location information, determining that the location information for the unregistered asset matches the determined location, and registering the unregistered asset in association with the asset tag in the database.

7. The method of claim 1, wherein each of the one or more asset tag collision reports indicates an identity of a reporting mobile device from which the asset tag collision report originated.

8. The method of claim 7, wherein the asset tag collision report identifies a location of the reporting mobile device within the indoor facility at a time when a wireless signal from the asset tag was detected by the reporting mobile device.

9. The method of claim 8, wherein the location of the reporting mobile device within the indoor facility is determined by the reporting mobile device using an indoor positioning application.

10. The method of claim 7, wherein the asset tag collision report includes a timestamp indicating a time at which the wireless signal from the asset tag was detected by the reporting mobile device.

11. A server for registering an asset tag in a database, the server comprising:
  a processor; and
  memory storing processor executable instructions that, when executed by the processor, cause the processor to
    receive, from at least one mobile device, one or more asset tag collision reports, each of the one or more asset tag collision reports including a tag identifier of the asset tag, wherein the tag identifier is transmitted to the at least one mobile device in wireless signals broadcast by the asset tag,
    determine a location of the asset tag based on the one or more received asset tag collision reports, and
    register the asset tag in association with the tag identifier and the determined location in the database.

12. The server of claim 11, wherein the processor executable instructions further cause the processor to determine, based on the location, one or more classes of assets, and wherein registering further includes registering the asset tag in association with said one or more classes of assets.

13. The server of claim 12, wherein the processor is to determine the one or more classes of assets based on the determined location and contextual data regarding the location.

14. The server of claim 13, wherein the determined location includes a determined height and wherein the contextual data includes data per class prescribing likely height of an asset of that class.

15. The server of claim 11, wherein the processor is to determine the location of the asset tag by identifying a defined area of the indoor facility in which the asset tag is located.

16. The server of claim 11, wherein the processor is to register the asset tag by identifying an unregistered asset having associated location information, determining that the location information for the unregistered asset matches the determined location, and registering the unregistered asset in association with the asset tag in the database.

17. The server of claim 11, wherein each of the one or more asset tag collision reports indicates an identity of a reporting mobile device from which the asset tag collision report originated.

18. The server of claim 17, wherein the asset tag collision report identifies a location of the reporting mobile device within the indoor facility at a time when a wireless signal from the asset tag was detected by the reporting mobile device.

19. The server of claim 18, wherein the location of the reporting mobile device within the indoor facility is determined by the reporting mobile device using an indoor positioning application.

20. The server of claim 17, wherein the asset tag collision report includes a timestamp indicating a time at which the wireless signal from the asset tag was detected by the reporting mobile device.

21. A non-transitory computer-readable medium storing processor-executable instructions that, when executed, cause a server to register an asset tag in a database, wherein the instructions comprise:
  instructions to receive, from at least one mobile device, one or more asset tag collision reports, each of the one or more asset tag collision reports including a tag identifier of the asset tag, wherein the tag identifier is transmitted to the at least one mobile device in wireless signals broadcast by the asset tag;
  instructions to determine a location of the asset tag based on the one or more received asset tag collision reports; and
  instructions to register the asset tag in association with the tag identifier and the determined location in the database.

* * * * *